United States Patent
Herrmann et al.

(10) Patent No.: US 7,801,112 B2
(45) Date of Patent: Sep. 21, 2010

(54) METHOD AND APPARATUS FOR ACCESSING AND INTERACTING WITH AN INTERNET WEB PAGE

(75) Inventors: Richard Louis Herrmann, Lisle, DuPage County, IL (US); Sunil K. Tewarson, Red Bank, Monmouth County, NJ (US); Vinh Thanh Vu, Colts Neck, Monmouth County, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2795 days.

(21) Appl. No.: 09/994,163

(22) Filed: Nov. 26, 2001

(65) Prior Publication Data

US 2002/0034177 A1 Mar. 21, 2002

Related U.S. Application Data

(62) Division of application No. 08/870,253, filed on Jun. 6, 1997, now Pat. No. 6,335,928.

(51) Int. Cl.
*H04L 12/66* (2006.01)
(52) U.S. Cl. .................................. 370/352; 379/93.09
(58) Field of Classification Search ................ 370/352, 370/354, 355, 410, 467, 522; 379/87–89, 379/93.09, 93.13; 704/3, 9, 277; 709/230, 709/231
See application file for complete search history.

(56) References Cited

U.S. PATENT DOCUMENTS

| | | | | |
|---|---|---|---|---|
| 5,604,737 | A * | 2/1997 | Iwami et al. | 370/352 |
| 5,608,786 | A * | 3/1997 | Gordon | 370/352 |
| 5,761,280 | A * | 6/1998 | Noonen et al. | 379/93.27 |
| 5,793,762 | A * | 8/1998 | Penners et al. | 370/389 |
| 5,867,495 | A * | 2/1999 | Elliott et al. | 370/352 |
| 5,884,262 | A * | 3/1999 | Wise et al. | 704/270.1 |
| 5,915,001 | A * | 6/1999 | Uppaluru | 379/88.22 |
| 5,945,989 | A * | 8/1999 | Freishtat et al. | 715/760 |
| 5,953,392 | A * | 9/1999 | Rhie et al. | 379/88.13 |
| 6,275,490 | B1 * | 8/2001 | Mattaway et al. | 370/352 |
| 6,285,683 | B1 * | 9/2001 | Lin | 370/466 |

OTHER PUBLICATIONS

Low, The Internet Telephony Red Herring, Hewlett-Packard Laboratories, pp. 1-15, May 15, 1996.*

* cited by examiner

*Primary Examiner*—Frank Duong
(74) *Attorney, Agent, or Firm*—Capitol Patent & Trademark Law Firm

(57) ABSTRACT

A facility is provided for interfacing the Internet with a telecommunications network and vice versa so that a user who does not have access to the Internet may, nevertheless, provide a Web page and update the Web page via the telecommunications network and so that a user may access the telecommunications network via the Internet.

10 Claims, 5 Drawing Sheets

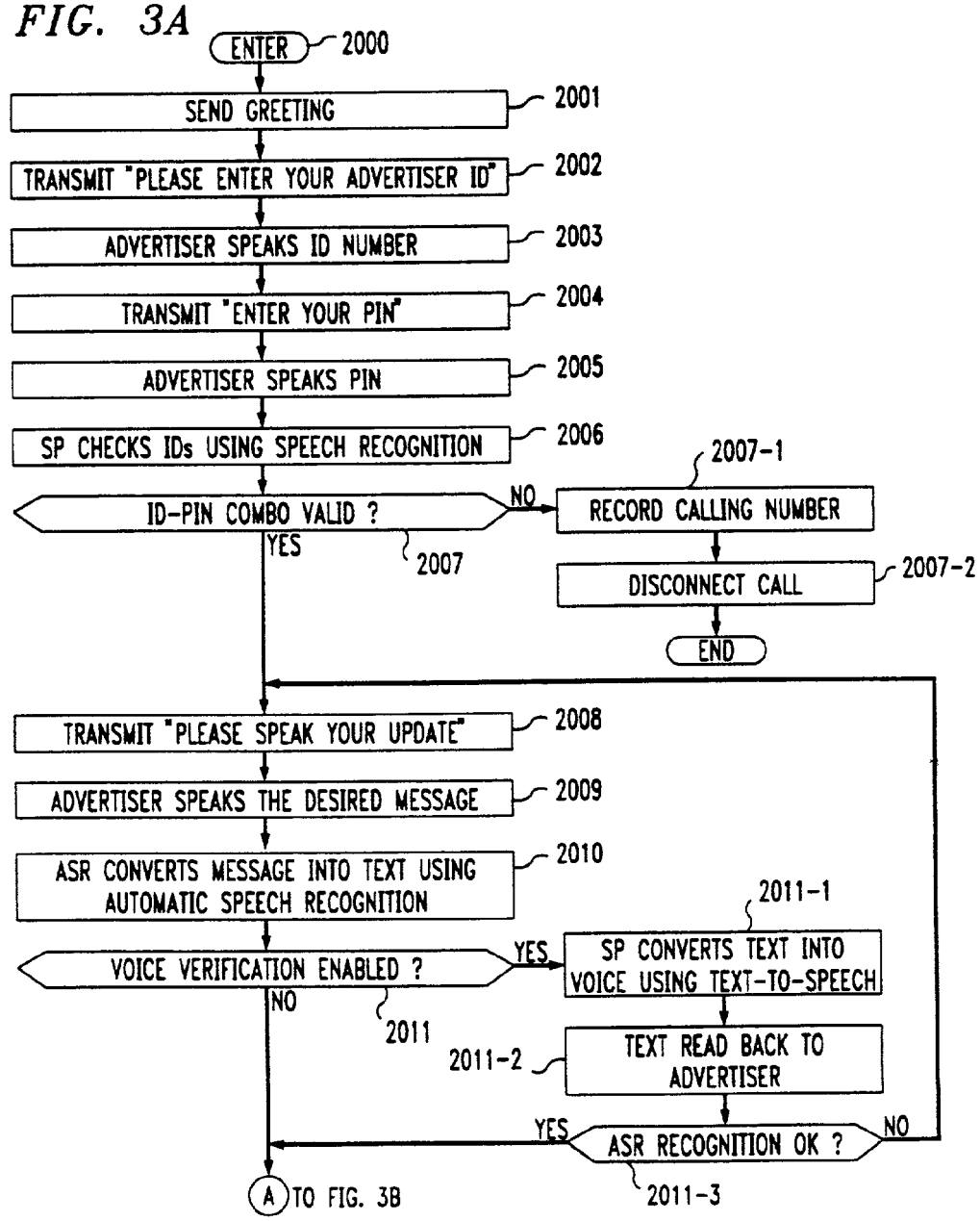

METHOD AND APPARATUS FOR ACCESSING AND INTERACTING WITH AN INTERNET WEB PAGE

RELATED APPLICATIONS

This patent application is a divisional of the U.S. patent application having a Ser. No. 08/870,253 and filed on Jun. 6, 1997 now U.S. Pat. No. 6,335,928.

FIELD OF THE INVENTION

The invention is directed to a system which interfaces a telecommunications device with a World-Wide-Web page and which interfaces a device connected to the World Wide Web with telecommunications facilities.

BACKGROUND OF THE INVENTION

In recent years, Internet-based services/applications, especially services which provide information via the World Wide Web (hereinafter also the "Web") as so-called Web pages, have experienced considerable growth. In fact, a large number of companies and individuals now have so-called Web sites that may be accessed via the Web. Moreover, more and more users are obtaining personal computers equipped with the appropriate hardware and software so that they can "browse" the Web to obtain information from various Web sites. The information that is supplied by a Web site may be volatile in some respects—meaning that it may quickly become outdated and, therefore, may need to be updated periodically. Thus, the owner of a Web site/page will access his Web page in a conventional way using a personal computer or the like and update the information that the site downloads to a user that accesses the Web page. For example, if the Web page is a menu associated with a particular restaurant, then the Web-page owner using a personal computer (equipped with the appropriate software and hardware) will access his Web page/site via the Web and interact with software defining the site/page to update the menu.

Based on the foregoing, it appears that it would be difficult for a person who does not know how to use or does not have access to a personal computer or the like to independently maintain a Web page/site.

SUMMARY OF THE INVENTION

It is apparent from the foregoing that a user needs a personal computer or similar apparatus equipped with the appropriate hardware (e.g., a modem) and Web browser software (e.g., Netscape Navigator) to access the web. The user would also need other software to maintain a Web site/page. Disadvantageously, then, a person who does not have these things cannot access the Web or maintain a Web site/page. We deal with this problem, in accordance with an aspect of the invention by providing a system platform that interacts with a subscriber's Web site/page in accordance with instructions received from the subscriber via a conventional telephone line. Accordingly, then, a subscriber of the inventive service only needs to have access to a conventional telephone station set or the like, e.g., facsimile, and place a call to the platform, and interact with the platform in order change/update the information that the subscriber's Web site/page supplies to a user who accesses the site/page via the Web. Alternatively, a subscriber may access conventional telecommunications services via the Web and a particular Web page/service supported by the inventive system, in accordance with another aspect of the invention. In this sense then, the inventive system platform provides an interface between the World Wide Web (Internet) and the public switched telephone network.

These and other aspects of the claimed invention will become apparent from the following detailed description and accompanying drawings.

BRIEF DESCRIPTION OF THE DRAWINGS

FIG. 2 is a flow diagram defining an exemplary embodiment of the interaction between the system platform and a caller, in accordance with the principles of the invention;

FIG. 3A is a flow diagram further defining an exemplary embodiment of the interaction between the system platform and a caller, in accordance with the principles of the invention;

DETAILED DESCRIPTION

An illustrative embodiment of the invention provides a system platform, FIG. 1, by which a subscriber (hereinafter also "user") having access to a conventional telephone station set may access Web-based applications without the need for a personal computer (PC) or the like and browser software. As used herein, the term telephone station set is defined as any communications device, with or without an alphanumeric display, such as, by way of a nonlimiting example, a conventional telephone station set, terminal, PC having telecommunications capabilities, an analog cellular telephone, a digital cellular phone with or without Personal Communication Services (PCS), a wireless phone, a wired (corded) phone, a personal digital assistant (PDA) (such as the Apple NEWTON™), a pager, an ASCII terminal, a PC without a browser, and the like. The alphanumeric display may be an LED, LCD, CRT, active matrix, or any other display device capable of displaying alphanumeric characters.

Figure 1:
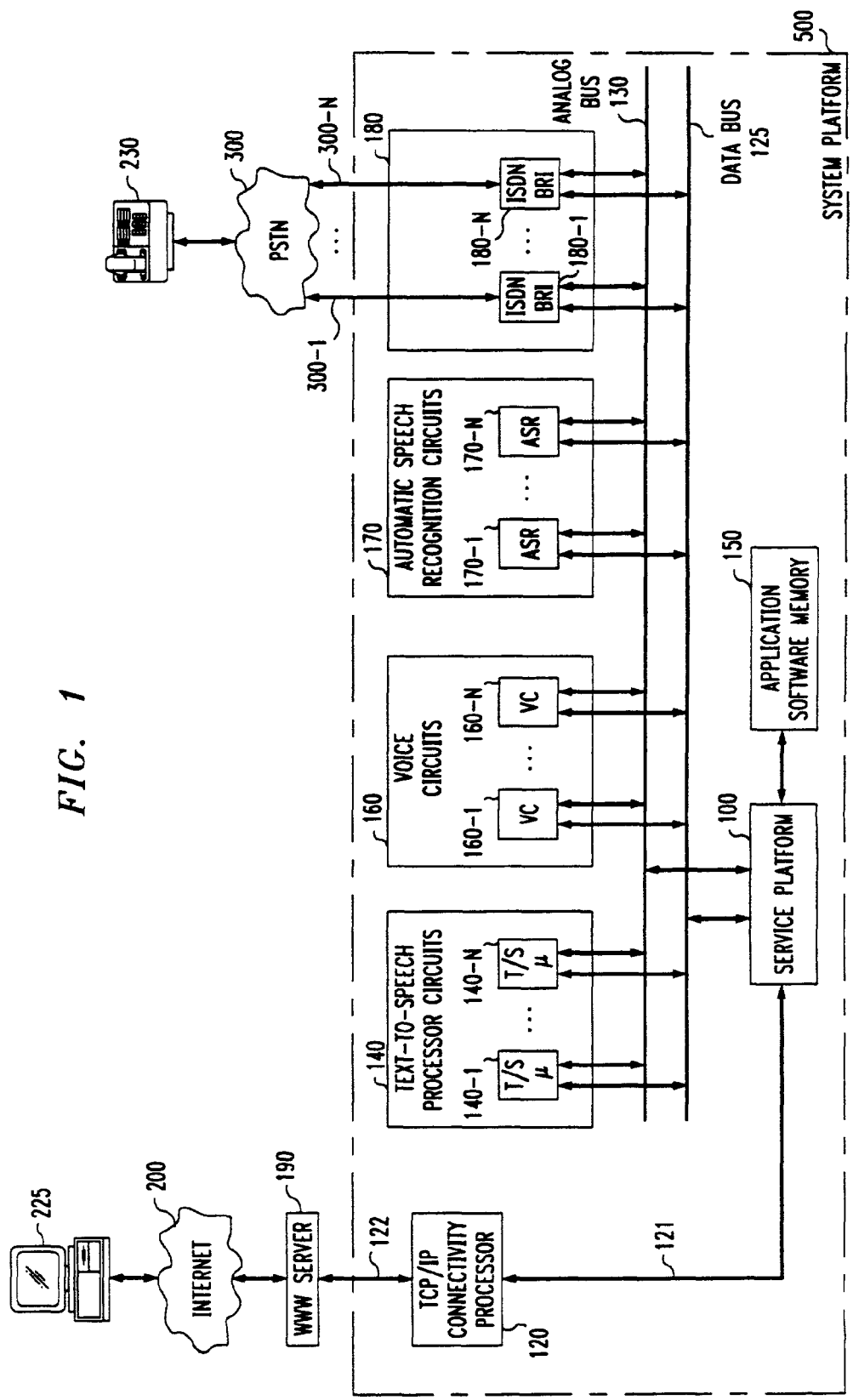
FIG. 1 is a block diagram of a system platform in which the principles of the invention may be practiced.

It is seen from FIG. 1 that system platform 500 includes, inter alia, service platform 100, application software memory 150 and a plurality of service circuits adapted to interface a particular application characterized by a respective software program that is stored with other application/service programs on memory 150 with telephone station 230 or computer 225. Such service circuits includes a plurality of conventional Text-To-Speech (TTS) processor circuits 140 which translate text into voice signals, a plurality of conventional voice circuits 160 which record, digitize and play back speech and other audio frequency sounds, a plurality of conventional Automatic Speech Recognition (ASR) circuits 170 which interpret speech signals received from a caller, and a plurality of conventional ISDN Basic Rate Interface (BRI) circuits 180 which provide an interface between system platform 500 and the Public Switched Telephone Network (PTSN). The service circuits exchange analog information (e.g., an announcement) with each other via assigned channels (time slots) of bus 130 (also identified as the "analog" bus) and communicate with service platform 100 over respective control and data channels of bus 125 (also identified as the "data" bus). System platform 500 also includes a conventional TCP/IP connectivity processor which provides an interface between service platform 100 and World Wide Web (WWW) server 190 connected to the Internet 200.

Assume that a user having access to station 230 operates a particular type of business and maintains a Web page on WWW server 190 that provides information about that business, e.g., a price list of goods sold by the business. Also assume that the business is planning to run a sale at price reductions of 25% on selected items and 10% on all other items sold by business. Further assume that the user at station 230 does not have to a PC to access and update his Web page regarding the planned sale. Irrespective of that limitation, the user may, nevertheless, access his Web page via station set 230, Public Switched Telephone Network (PSTN) 300 and system platform 500. Specifically, in order do so all that the user needs to do is to place station 230 in an off-hook state and, responsive to hearing dial tone returned by PSTN 300, dial a telephone number associated with the user' system 500 subscription, e.g., a so-called 800 telephone number such as 1-800-EASYADS. System platform 500 in response to receipt of the call via one of the idle call paths 300-1 through 300-n will then interact with the caller and allow the caller to access his Web page and update the Web page if the caller wishes to do so. That is, each of the circuits 180-1 through 180-n presents a conventional ISDN Basic Rate Interface to PSTN 300, such that PSTN 300 forwards a calls to platform 500 by selecting an idle one of the paths 300-1 through 300-n and routes the call over that path, e.g., path 300-1. PSTN 300 does so in a conventional manner by sending signaling information relating to the incoming call over an idle signaling channel and forwarding the actual call over one of the two B channels associated with the signaling channel. Such signaling information includes the called number. When the signaling information for the incoming call is received at the idle BRI 180i, then that BRI inserts the received information in an appropriate data message and sends the message to service platform 100 via an a bus 125 control/data channel assigned to that BRI, e.g., BRI 180-1.

Figure 3B:
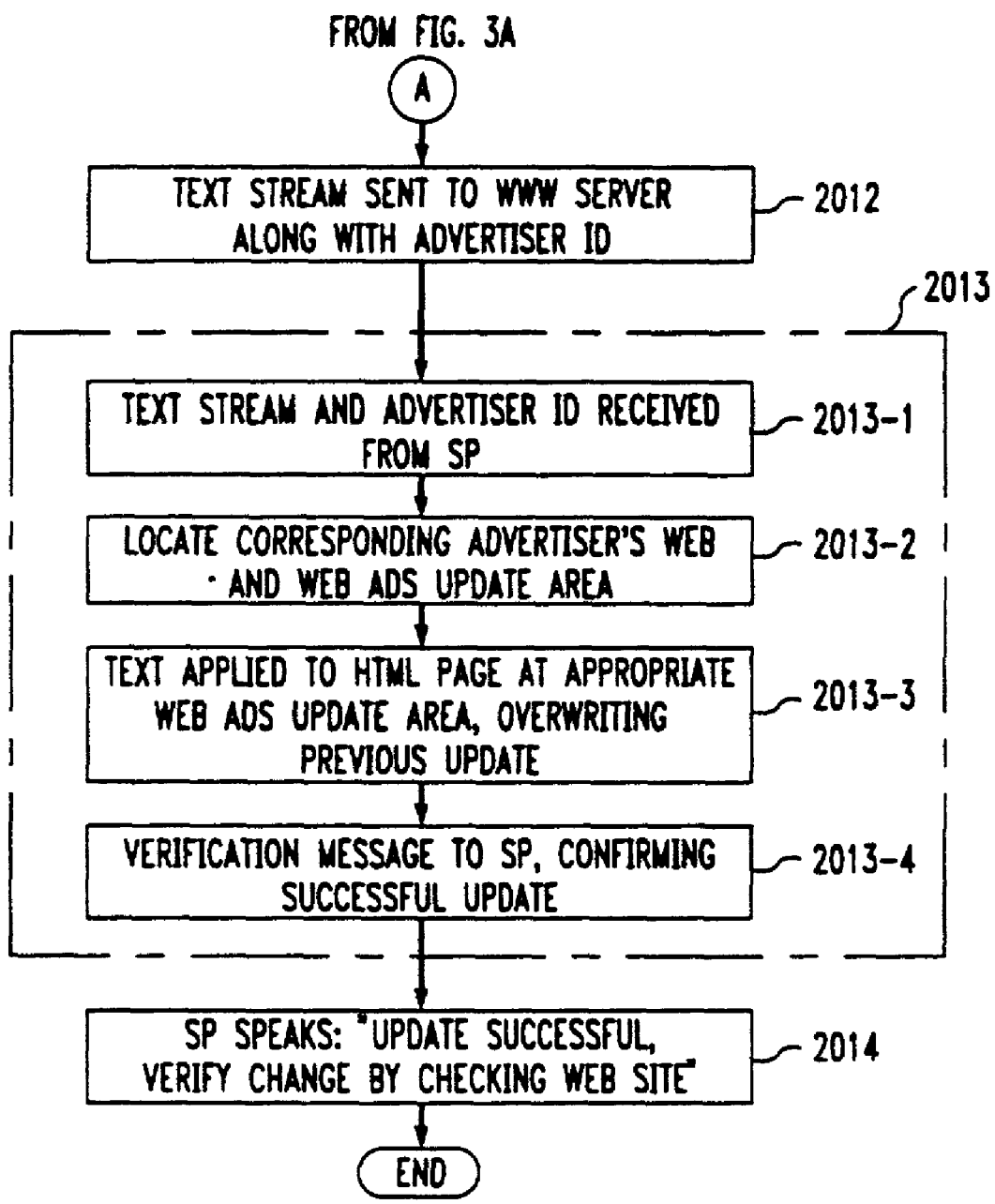
FIG. 3B is a flow diagram yet further defining an exemplary embodiment of the interaction between the system platform and a caller, in accordance with the principles of the invention.

A flow diagram defining the interaction between system platform 500 and the caller is shown in FIGS. 2 and 3A-3B. Service platform 100, in accordance with block 1001 of the flow chart of FIG. 2 invokes the service application based on the contents of the received DNIS. That is, platform 100 derives the identity of the desired service from the contents of the DNIS and associates a copy of that application with the incoming call (block 1002), in which the application is stored in application software memory 150. A flow chart of the service which allows a subscriber to access and update his Web page via a telecommunications path, i.e., from a telephonic device, is shown in FIGS. 3A-3B. Specifically, when a copy of the application is invoked to serve the incoming call, the application selects an idle T/S processor 140i, e.g., 140-1, and sends that processor the text of a greeting that is to be returned to the calling party (block 2001). The application via platform 100 does this by sending such text in a data message to T/S processor 140-1 in bus 125 control and data channel assigned to T/S 140-1. In addition, platform 100 also selects a bus 130 idle channel that is to be used to transmit the translated speech to BRI 180-1. Platform 100 sends a "listen" message to BRI 180-1 directing that channel to scan the bus 130 channel that will be carrying the translated speech. T/S processor 140-1 upon receipt of the message translates the textual portion of the message into speech and outputs the speech to the identified bus 130 channel. BRI 180-1, in turn, reads the speech from that channel and transmits the speech over ISDN path 300-1.

The application (block 2002), in a similar manner, then transmits (via T/S processor 140-1 and BRI 180-1) a prompt to the caller requesting the caller to enter a so-called advertiser ID. The application then directs BRI 180-1 to output speech received from the call to a selected channel of bus 130 and directs an idle one of the ASR (Automatic Speech Recognition) circuits 170i, e.g., 170-1 to perform a conventional ASR function with respect to speech appearing on that channel and supply the result to platform 100. When the caller verbally enters his advertiser ID (block 2003) and it is received by BRI 180-1 and outputted to the selected bus 130 channel, ASR 170-1 removes the speech from that channel and subjects the speech to a conventional ASR process. ASR 170-1 outputs a digital representation of the result to the control/data channel 125 assigned to ASR 170-1 upon completing that process. In a similar manner, the application process (block 2004) then transmits a prompt requesting that the caller enter his Personal Identification Number (PIN). When the caller responds (block 2005) and such response has been processed by ASR 170-1, then the application program (block 2006) checks the validity of the caller's entries. (Note that in the FIGS., SP means system platform.) If the entries are found to be invalid (block 2007), then the application program records the calling number (block 2007-1) and then directs BRI 180-1 via the assigned control/data channel to disconnect (block 2007-2) from the call. (It is noted, that in the alternative, the program could be arranged to loop through blocks 2002 through 2006 a number of times and if the caller's entries are still not valid, then the program would proceed to disconnect from the call.)

Assuming that the caller's entries are found to be valid, then the program (block 2008) in a similar manner transmits a prompt requesting that the caller enter his update. Similarly, the program then directs an idle ASR 170i, e.g., ASR 170-2 to monitor a selected channel and to perform an ASR function on speech signals that are received over that channel. Similarly, the application program directs BRI 180-1 to output the caller's response to the selected channel when it is received. When the caller's update has been received and converted to text by ASR 170-2 and supplied to platform 100 via bus 125, then the application program (block 2011) checks to see if the caller's subscription indicates verification of the update before it is posted to the caller's Web page. If so, then the program "plays back" the caller's update. The program (blocks 2011-1 and 2011-2) does this by selecting an idle T/S processor 140i, e.g., processor 1403, sending the textual update to that processor via the bus 125 control/data channel assigned to that processor with a message to output the translated speech to a selected channel of bus 130. The program via platform 100 also notifies BRI 140-1 to read the speech from the latter channel and output it to ISDN path 300-1. The program also transmits a confirmation request to the caller in the manner discussed above. When the response has been received and processed as described above, the program (block 2011-3) checks see if the confirmation is affirmative. If not, then the program returns to block 2008. If so, then the program (block 2012), through service platform 100, sends the text update in a text message also containing a transaction identifier and advertiser ID to conventional TCP/IP processor 120 via path 121. TCP/IP processor 120 converts the message to a form that conforms with the TCP/IP protocol and sends the result to WWW server 190 via path 122.

For clarity and conciseness the actions taken by WWW server 190 in response to receipt of the message is shown as dotted block 2013 in line with the application program. Upon receipt of the message (block 2013-1) from system platform 500, WWW server 190 uses the caller's entered advertiser ID (block 2013-2) to locate in associated memory (not shown) the caller's stored Web page. WWW server 190 (block 2013-3) then updates the web page in a conventional manner and then returns (block 2013-4) a verification message containing the transaction ID to platform 100 via TCP/IP processor 120. The application program (block 2014) then sends confirmation text to an idle one of the T/S processors 140 with instructions to output the resulting translated speech to a selected channel of bus 130. The application program also instructs BRI 180-1 to read the speech from that channel and transmit the speech to the caller via ISDN path 300-1. The program then exits and, in doing so, instructs BRI 180-1 to terminate the call. BRI 180-1, in turn, sends an appropriate message in the D signal channel of path 300-1 instructing the PSTN switch connected to path 300-1 to terminate the call.

Figure 4:
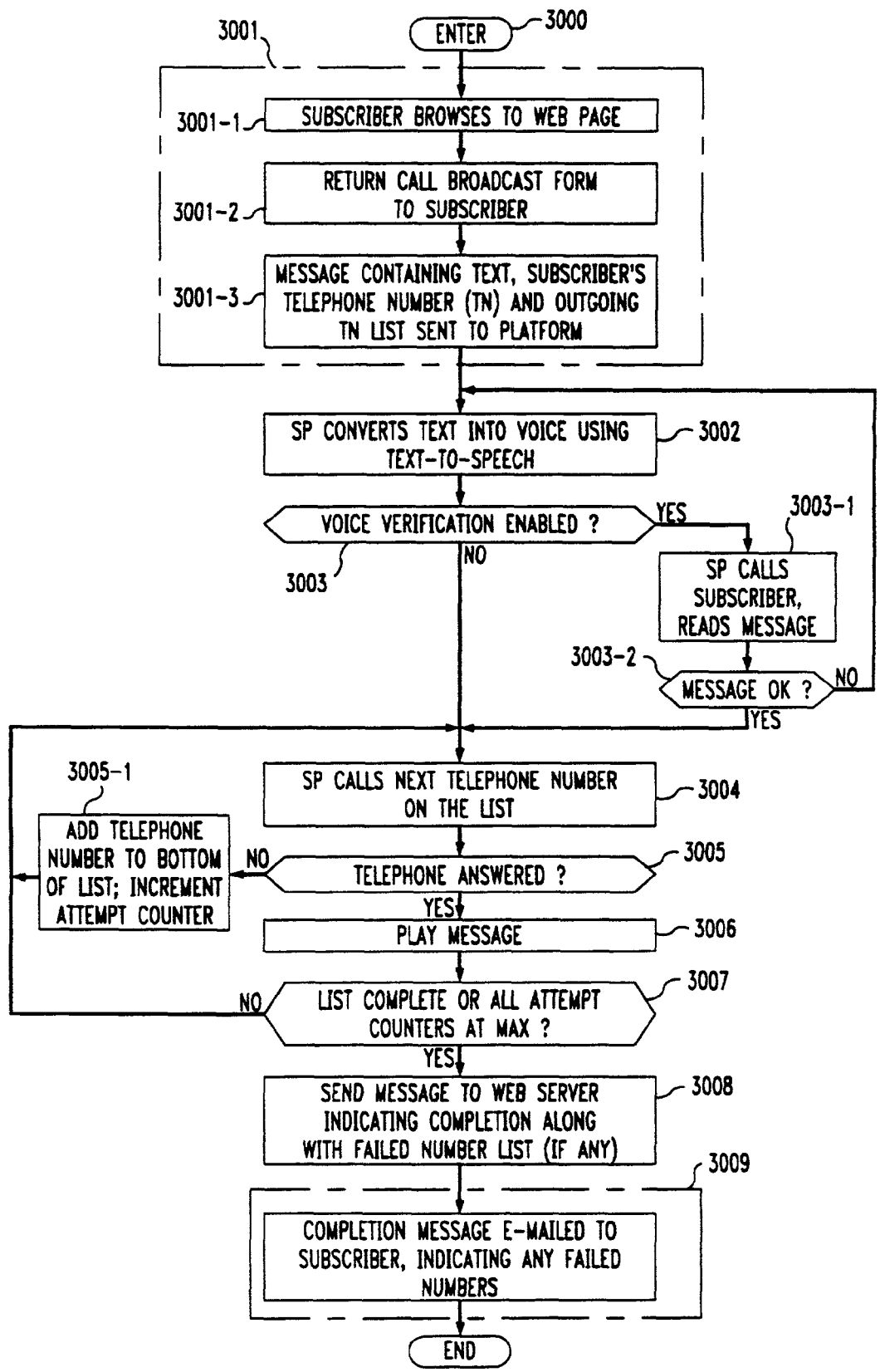
FIG. 4 is a flow diagram further still defining an exemplary embodiment of the interaction between the system platform and a caller, in accordance with the principles of the invention.

As mentioned above, a subscriber may access conventional telecommunications services via the Web (Internet) 200 and a particular Web page/service supported by the inventive system, in accordance with another aspect of the invention. In this sense then, the inventive system platform provides an interface between the digital based World Wide Web (Internet) and the voice based public switched telephone network. One application which illustrates the feature of accessing telecommunication serves via the Web is shown in FIG. 4.

Figure 5:
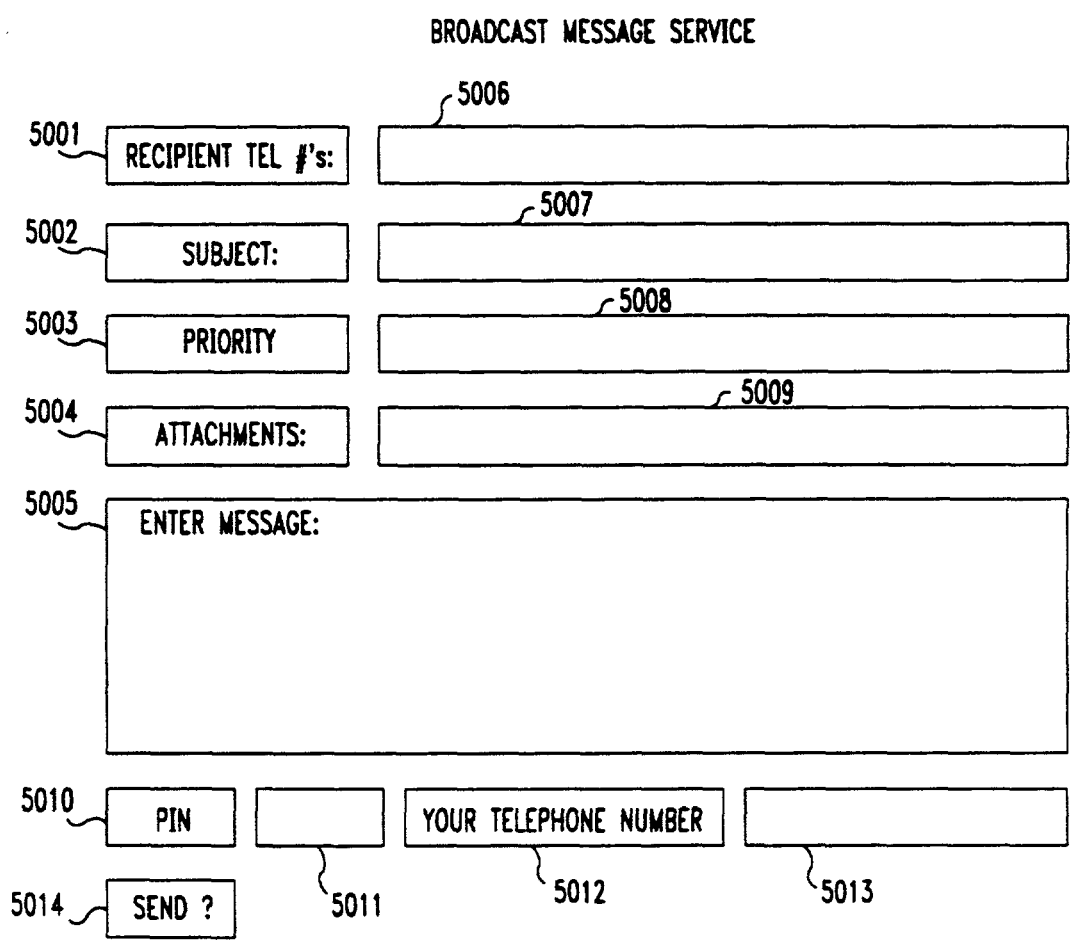
FIG. 5 is an illustrative example of the fields included in a broadcast message service form in accordance with the principles of the invention.

Specifically, a subscriber that desires to access a particular telecommunications service, e.g., broadcasting a telephone message to a number of different telephone numbers, may do so by "bringing up" on an associated PC, e.g., PC 225, a so-called Internet browser program. One such program is the well-known Netscape Navigator web browser available from the Netscape Co. Once the program has been invoked and the appropriate input screen is displayed on the display of PC 225, then the subscriber may enter a so-called a URL identifying Web site 190 and the desired Web page associated with the desired service. PC 225, in turn, sends via Internet 200 a TCP/IP protocol access message containing the address of the sender to the identified Web site (block 3000-1). WWW server 190 upon receipt of the message, invokes software defining the Web page identified in the received URL, which software returns (block 3001-2) a "canned" form to the sender for display thereat. An illustrative example of such of form is shown in FIG. 5. Briefly, the input message comprises a plurality fields 5006 through 5009 identified by respective field labels 5001 through 5004. Thus, when the form is displayed at PC 225, the subscriber thereat in a conventional manner enters in field 5006 the telephone numbers of the parties that are to receive the broadcast message that the subscriber enters in field 5005. In accord with an aspect of the invention, the subscriber may enter a so-called "alias" identifying a predefined list of telephone numbers stored in memory on behalf of the subscriber. For example, if the alias is "department" then the list of stored list of telephone numbers may be the telephone numbers of other people who are associated with "department" in some way. Optionally, the subscriber may enter in (a) field 5007 the subject of the broadcast message, (b) field 5008 the level of priority of the message, and (c) field 5009 attachments to the broadcast message. When the subscriber has completed "filling in" the form and has entered (a) his PIN in field 5011 identified by adjacent label field 5010, and (b) a reach telephone number in field 5013 identified by adjacent label field 5012, then the subscriber may "point to" send field 5014 to cause the invoked browser software to send the completed form to Web server 190 in a conventional manner. PC 225, in turn, forms the entered information into TCP/IP packet(s) containing the aforementioned URL and address of Web server 190 and transmits the packet(s) over Internet 200. Upon receipt of the packet(s), Web server 190 (block 3001-3) supplies the packet(s) to processor 120 via path 122. Processor 120 converts a packet(s) from one that conforms with the TCP/IP protocol to a data message having a format recognized by service platform 100. Processor 120 then supplies the reformatted message to service platform 100 via 121.

Service platform 100, responsive to receipt of that message, unloads the contents of form field 5011 to determine the validity of the entered PIN in a conventional manner, i.e., compares the PIN against a list of valid pins. If the pin is not valid, then service platform 100 discards the message. Otherwise, it stores the message in memory 150 in association with the subscriber's PIN. Service platform 100 then checks the contents of priority field 5008 and sets a message processing priority indicator based on such contents. That is, if the contents of field 5008 indicate low priority, e.g., by a value of one, then service platform 100 broadcasts the message during an "unbusy" hour, e.g., non-business hours. If the such contents indicate high priority, e.g., by a value of five, then service platform 100 will broadcast the message immediately. Assume the latter case for the present illustrative example. In that case, then, Service platform 100 (block 3002) selects an idle T/S processor 140i, e.g., 140-4, and sends the contents of the subject field 5007, attachments field 5009 (if any) and message field 5005 to T/S processor 140-4 with instructions to store the converted speech in local memory. Service platform 100 then checks the subscriber's subscription to determine if subscriber has also subscribed to a verification feature. If not (block 3003), then the application program proceeds to block 3004. Otherwise, the application program (block 3003-1) selects an idle BRI circuit 180i, e.g., BRI circuit 180-5, and sends instructions to that circuit via bus 125 to place a telephone call to the telephone number entered in field 5013 of the received form. (Note, if the subscriber did not enter such telephone number, then, as a default, a call is placed to the subscriber's telephone number contained in the subscriber's subscription record.) When the call is answered and is so detected by BRI 180-5, then BRI 180-5 notifies service platform 100 of that fact in a conventional manner via bus 125. At that point, service platform 100 instructs a voice circuit, VC 160-1, to output the converted speech to a selected channel of bus 130, and instructs BRI circuit 180-5 to read the speech from that channel of bus 130 and transmit the speech to the subscriber. When the last of the speech signals have been so transmitted and voice circuit VC 160-1 has notified service platform 100 of that fact, then service platform 100, under control of the application program, instructs that circuit to unload a predefined verification announcement from its local memory and output the message to a selected channel of bus 130. Similarly, the program instructs BRI circuit 180-5 to remove the announcement from bus 130 and transmit it to the subscriber. One such verification message may be, for example, "If the broadcast message is correct press one, otherwise press two". The program then waits for receipt of the subscriber's response. If the program receives a value of one from the subscriber via BRI circuit 180-5 and bus 125, or doesn't receive a response within a prescribed period of time from the playing of the announcement, e.g., 10 seconds, then program proceeds to block 3004. If, on the hand the program receives a value of two, then the program returns to block 3002 to repeat the text to speech translation. (Note that if the subsequent determination at block 3003-2 results in the subscriber entering a two, indicating that the message is again unacceptable to the subscriber, then the program will retransmit form 5000 to the subscriber for re-entry if the subscriber so desires.)

At block 3004, the program terminates the call to the subscriber and then instructs BRI circuit 180-5 to place a call to the first telephone number contained in field 5006 of the entered form. When BRI circuit 180-5 places the call and detects that the call is answered (block 3005), it notifies service platform 100 of that fact via bus 125. The program (block 3006) then selects an idle Voice Circuit 160, e.g., VC 160-1, to output the voice signal to bus 130 and instructs BRI circuit 180-5 to read bus 150 and transmit the voice signal to the called station. When the last of such speech has been so transmitted then a trailer to the message playing a closing greeting, e.g., "thank you for listening to this message", is transmitted to the called station. If the call is not answered, then the program places the called number at the end of the list of telephone numbers contained in field 5006. The program (block 3007) then checks to see if it has sent the message to each of the telephone numbers contained in field 5006. The program also checks to see if it has attempted to complete a call to all unanswered locations for the prescribed number of times as determined by respective attempt counters associated with such calls. If not, then the program returns to block 3004 to place a call to the next telephone number on the list. If so, then the program (block 3008) forms a message containing (a) the subscriber electronic mail address, (b) information indicating that the broadcast has been completed and (c) information identifying the failed telephone numbers (if any). The program then causes service platform 100 to send the message to the subscriber as so-called electronic mail via conventional TCP/IP processor 120 and WWW server 190 (block 3009).

The foregoing is merely illustrative of the principles of the invention. Those skilled in the art will be able to devise numerous arrangements, which, although not explicitly shown or described herein, nevertheless embody those principles that are within the spirit and scope of the invention. For example, a user may access a Web page defining a telephone directory, for example, the "Yellow pages" and select names and telephone numbers from the directory, direct system platform 500 place calls to the selected telephone numbers in the manner discussed and read a prescribed announcement to each called party. As another example, system platform 500 may be arranged to accept a response from the called party and then deliver the response and called number to the user via the server 190 and the Internet.

We claim:

1. A service platform connected to the Internet and to a telecommunications network comprising:
   first apparatus for interfacing said service platform with the Internet so that a first user may access the telecommunications network via the Internet, and, responsive to receipt of a request from said first user to broadcast text received from said first user via the Internet to a number of identified telephone numbers, for converting the text to audible speech, placing a telephone call in turn to each of the identified telephone numbers, transmitting the audible speech over an associated call connection if the call is answered or reattempting the placing of that call at a later time if the call is not answered,
   and
   second apparatus for interfacing said service platform with the telecommunications network so that a second user may access the Internet via the telecommunications network.

2. The service platform of claim 1, said first apparatus, responsive to receipt of a request from said first user to broadcast text that is entered by said first user via the Internet to a number of identified telephone numbers,
   for further converting the text to speech, placing a call to said first user and transmitting the converted speech to the first user so that the first user may approve the transmission of the speech to said each of the identified telephone numbers.

3. The service platform of claim 2, said first apparatus, responsive to the first user not approving the converted speech, for further transmitting via the Internet a request to the first user to re-enter the text.

4. The service platform of claim 1, said second apparatus for further receiving a telephone call from the second user via the telecommunications network and interacting with the second user to obtain information used to change the contents of a particular Web page accessed via the Internet, said second apparatus including a third apparatus, responsive to receipt of such instructions, for accessing and changing the particular Web page in accordance with the received instructions.

5. The service platform of claim 4 wherein said instructions are uttered by said caller and wherein said second apparatus includes voice conversion apparatus for converting said uttered instructions into text for insertion in said Web page.

6. The service platform of claim 4, said second apparatus for further transmitting to second user over the associated call connection a verbal rendition of the converted text.

7. The service platform of claim 6, said second apparatus, responsive to receipt of an indication from said second user that the verbal rendition is correct, for further forwarding the converted text to a Web server to change said particular Web page in accordance with the converted text.

8. The service platform of claim 6, said second apparatus, responsive to receipt of an indication from said second user that the verbal rendition is incorrect, for further forwarding the request to the second user to retransmit the instructions.

9. The service platform of claim 4, said second apparatus, operative when said Web page has been successfully changed, for further notifying said second user via the telecommunications network.

10. The service platform of claim 1 wherein said telecommunications network is a public switched telephone network.

* * * * *